US 6,564,002 B1

(12) United States Patent
Murakami et al.

(10) Patent No.: US 6,564,002 B1
(45) Date of Patent: May 13, 2003

(54) EDITING SYSTEM AND METHOD, IMAGE RECORDER, EDITING DEVICE AND RECORDING MEDIUM

(75) Inventors: Hirofumi Murakami, Kanagawa (JP); Katsuhiko Aihara, Kanagawa (JP); Yasushi Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/171,110

(22) PCT Filed: Feb. 16, 1998

(86) PCT No.: PCT/JP98/00628
§ 371 (c)(1),
(2), (4) Date: Apr. 5, 1999

(87) PCT Pub. No.: WO98/36566
PCT Pub. Date: Aug. 20, 1998

(30) Foreign Application Priority Data

Feb. 14, 1997 (JP) .............................................. 9-030560

(51) Int. Cl.⁷ ................................................. H04N 5/93
(52) U.S. Cl. .............................. 386/52; 386/55; 386/65; 386/81
(58) Field of Search ................................. 386/4, 46, 52, 386/55, 65, 81, 83; 360/13; 345/302, 328

(56) References Cited

U.S. PATENT DOCUMENTS

| | | | | |
|---|---|---|---|---|
| 4,360,843 A | * | 11/1982 | Menezes et al. | 386/65 |
| 4,685,003 A | * | 8/1987 | Westland | 386/52 |
| 5,488,409 A | * | 1/1996 | Yuen et al. | 386/83 |
| 5,642,285 A | * | 6/1997 | Woo et al. | 348/512 |
| 5,930,445 A | * | 7/1999 | Peters et al. | 386/52 |
| 6,154,207 A | * | 11/2000 | Farris et al. | 345/328 |

FOREIGN PATENT DOCUMENTS

| | | |
|---|---|---|
| JP | 6-131820 | 5/1994 |
| JP | 8-130701 | 5/1996 |
| WO | WO 96/05696 | 2/1996 |

* cited by examiner

*Primary Examiner*—Andrew Christensen
*Assistant Examiner*—Christopher Onuaku
(74) *Attorney, Agent, or Firm*—Frommer Lawrence & Haug LLP; William S. Frommer; Darren M. Simon

(57) ABSTRACT

To improve the efficiency of primary editing of a video tape, a shot mark as a mark at the time of primary editing is determined. With a video tape of a digital VTR format, the shot mark may be recorded onto a user's bit on a time code track. Even at the time of editing, this shot mark may be appended. At the time of primary editing, a predetermined range specified with reference to the position of the shot mark is defined as a portion to be used, thereby preparing a master tape.

13 Claims, 13 Drawing Sheets

EDITING SYSTEM AND METHOD, IMAGE RECORDER, EDITING DEVICE AND RECORDING MEDIUM

TECHNICAL FIELD

This invention relates to an editing system and method, and an image recording device which enable providing a mark for specifying a portion to be used (necessary image) during confirmation of a material tape (also referred to as "original tape") in video editing, and an editing device and a recording medium for editing video signals by using the mark.

BACKGROUND ART

In conventional video editing, for editing recording material data, the operation to reproduce and confirm the recording material data is repeated. for a number of times by using a shuttle dial and a jog dial on an operating panel of an editing device, so as to search and set an editing point. Also, setting of an IN-point (editing start point) and an OUT-point (editing end point) as editing points is determined by operating a plurality of operating switches on the operating panel.

A conventional editing method is now described in detail. FIG. 1 is a view for explaining the conventional editing method. On a material tape 1 shot by a cameraman, scene A, scene B, scene C, scene D, scene E, . . . are recorded in the order shown in the recording direction or the reproducing direction. The lengths of these scenes actually differ from one another depending on the shooting time of each scene, though indicated as equal spacings in order to simplify the drawing. The same can apply to the other drawings. A "REC" mark (also referred to as "REC start" mark) indicates a portion where the cameraman pressed a recording button in camera operation so as to start shooting of each scene.

From such material tape 1, editing work is carried out by using an editing device so as to cut out portions to be used. The conventional editing work is carried out by repeating reproduction and rewind of the material tape 1 for a number of times at an editing studio of a broadcasting station. In assemble mode editing, the portions to be used are sequentially recorded onto a master tape while the editing start point (IN-point) as the leading end of the portion to be used is accurately determined, by operating a plurality of operating switches on an operating panel. On the other hand, in insert editing, the portions to be used are recorded onto a master tape while the editing start point (IN-point) and the editing end point (OUT-point) are accurately determined.

Information of these IN-point and OUT-point is stored together with time codes thereof into an editing register of the editing device. Editing data consists of t1 seconds from the IN-point to the OUT-point. In this manner, the IN-points and the OUT-points of a plurality of portions to be used for broadcasting are determined one by one while reproduction and rewind are repeated for a number of times.

By setting the editing device to an automatic editing mode after determining a plurality of necessary editing data, a master tape may be provided.

In determining the editing points in this editing work, the time and time codes corresponding to images and sounds must be recorded by using paper and a pencil. Alternatively, program editing must be carried out by using a dedicated editing machine. In another method, rough editing is carried out by hard-copying the tape material at a scene change point and setting an editing portion while viewing the hard copy. Such accurate determination of the editing points is effective means for detailed editing as the last stage of editing.

However, for temporary editing (also referred to as "rough editing"or "simplified editing"), that is, editing at the reporting site or first editing at the editing studio, the existing editing method is inconvenient in various aspects.

Also, if certain marking may be appended onto a video tape when the cameraman can shoot satisfactory images during shooting, the marking will be very convenient for subsequent editing.

If, in rough editing, the cameraman at the site carries out editing, the editing portions may be predicted at a relatively high probability. Therefore, if the portions to be used may be roughly specified in the operation of reproducing the entire video tape once, it will be convenient for subsequent editing.

Thus, development of an editing method and an editing device suitable for rough editing and a VTR tape used therefor has been demanded.

In view of the foregoing status of the art, it is an object of the present invention to provide a more simplified editing system and method which may be used for temporary editing work.

It is another object of the present invention to provide an image recording device which is suitable for carrying out a more simplified editing method used for temporary editing work.

In is a further object of the present invention to provide a recording medium which is suitable for carrying out a more simplified editing method used for temporary editing work.

DISCLOSURE OF THE INVENTION

An editing system according to the present invention is adapted for editing a video material recorded on a recording medium. The editing system includes: a video camera having shooting means for shooting an object, and recording means for recording video data of a video material shot by the shooting means onto the recording medium; and an editing device having reproducing means for reproducing the video data of the video material from the recording medium, and editing means for editing the video data of the video material on the recording medium by using the video data reproduced by the reproducing means. The recording means of the video camera has first mark data recording means for recording first mark data at a position corresponding to the video data on the recording medium in response to marking operation by an operator. The reproducing means of the editing device has mark data reproducing means for reproducing the first mark data recorded on the recording medium, and the editing means of the editing device edits the video material recorded on the recording medium by using the first mark data reproduced by the mark data reproducing means.

The editing device has second mark data recording means for recording second mark data of a type different from that of the first mark data, at a position corresponding to the position on the recording medium where the video data is recorded in response to the marking operation by the operator based on the video data reproduced by the reproducing means.

Also, the mark data reproducing means of the editing device reproduces the first mark data and the second mark data, and the editing means of the editing device edits the video material recorded on the recording medium by using the first mark data and the second data reproduced by the mark data reproducing means.

The first mark data is a shot mark, and the second mark data is an edit mark.

The recording medium is a tape-like recording medium, and the mark data is recorded on a time code track arranged in a longitudinal direction of the tape-like recording medium.

The first mark data is recorded onto the time code track by the first mark data recording means at the same time as recording operation of the recording means of the video camera for recording the video data onto a helical track of the tape-like recording medium, and the second mark data is overwritten by the second mark data recording means onto the time code track of the tape-like recording medium having the video data already recorded on the helical track thereof.

In one area of the time code track corresponding to one frame of the video data, a synchronizing signal recording area for recording a synchronizing signal, a plurality of time code recording bit areas for recording the time code, and a plurality of user's data recording bit areas for recording user's data are provided.

The plurality of user's data recording areas include a first bit area for recording a start code indicating a start position of the user's data, a second bit area for recording an identification code of the mark data, a third bit area for recording a serial number code expressing a serial number of the mark data, and a fourth bit area for recording check data for checking the start code, the mark data identification code and the serial number code.

In the second bit area, the same mark data identification code is recorded over a predetermined frame period of the video data.

The serial number code recorded in the third bit area indicates a recording position of the mark data reproduced by the mark data reproducing means, in the predetermined frame period.

The mark data reproducing means reproduces all data recorded on the time code track, and the editing means refers to the serial number code reproduced by the mark data reproducing means, thereby calculating a time code corresponding to mark data recorded first of the mark data recorded over the predetermined number of frames so as to recognize the calculated time code as a time code at the time of marking by the operator.

Also, an editing system according to the present invention is adapted for editing a video material recorded on a recording medium. The editing system includes: recording means for recording video data as an editing material onto the recording medium and recording mark data at a position corresponding to the video data on the recording medium in response to the timing of operation by an operator; reproducing means for retrieving the mark data recorded on the recording medium while reproducing the video data from the recording medium at a high speed; and editing means for editing the editing material recorded on the recording medium by using the video data stored at the position corresponding to the mark data retrieved by the reproducing means.

The recording medium is a tape-like recording medium, and the mark data is recorded on a time code track arranged in a longitudinal direction of the tape-like recording medium. The reproducing means retrieves the mark data at a high speed by reproducing information recorded on the time code track by using a head different from a reproducing head for the video data.

One area of the time code track corresponding to one frame of the video data includes a synchronizing signal recording are a for recording a synchronizing signal, a plurality of time code recording bit areas for recording the time code, and a plurality of user's data recording bit areas for recording user's data.

The plurality of user's data recording areas include a first bit area for recording a start code indicating a start position of the user's data, a second bit area for recording an identification code of the mark data, a third bit area for recording a serial number code expressing a serial number of the mark data, and a fourth bit area for recording check data for checking the start code, the mark data identification code and the serial number code.

In the second bit area, the same mark data identification code is recorded over a predetermined frame period of the video data.

The serial number code recorded in the third bit area indicates a recording position of the mark data reproduced by the mark data reproducing means, in the predetermined frame period.

The reproducing means reproduces all data recorded on the time code track, and the editing means refers to the serial number code reproduced by the reproducing means, thereby calculating a time code corresponding to mark data recorded first of the mark data recorded over the predetermined number of frames so as to recognize the calculated time code as a time code at the time of marking.

An editing method according to the present invention includes the steps of recording video data of an editing material onto a recording medium, recording mark data at a position corresponding to the video data on the recording medium in response to the timing of operation by an operator, retrieving the mark data recorded on the recording medium while reproducing the video data from the recording medium at a high speed, and editing the editing material recorded on the recording medium by using the video data stored at the position corresponding to the retrieved mark data.

Also, an editing system according to the present invention is adapted for editing a video material recorded on a recording medium. The editing system includes: recording means for recording video data as an editing material onto the recording medium and recording a plurality of types of mark data at a position corresponding to the video data on the recording medium in response to the timing and operating state of operation by an operator; reproducing means for retrieving only a predetermined type of mark data selected from the plurality of types of mark data; and editing means for editing the editing material recorded on the recording medium by using the video data stored at the position corresponding to the mark data retrieved by the reproducing means.

The recording medium is a tape-like recording medium, and the mark data is recorded on a time code track arranged in a longitudinal direction of the tape-like recording medium.

One area of the time code track corresponding to one frame of the video data includes a synchronizing signal recording area for recording a synchronizing signal, a plurality of time code recording bit areas for recording the time code, and a plurality of user's data recording bit areas for recording user's data.

The plurality of user's data recording areas include a first bit area for recording a start code indicating a start position of the user's data, a second bit area for recording mark data identification codes indicating identification codes of the plurality of mark data, a third bit area for recording serial number codes expressing serial numbers of the mark data, and a fourth bit area for recording check data for checking the start code, the mark data identification codes and the serial number codes.

The reproducing means retrieves only a selected type of mark data from the plurality of types of mark data, referring to the mark data identification code.

In the second bit area, the same mark data identification code is recorded over a predetermined frame period of the video data.

The serial number code recorded in the third bit area indicates a recording position of the mark data reproduced by the mark data reproducing means, in the predetermined frame period.

The reproducing means reproduces all data recorded on the time code track, and the editing means refers to the serial number code reproduced by the reproducing means, thereby calculating a time code corresponding to mark data recorded first of the mark data recorded over the predetermined number of frames so as to recognize the calculated time code as a time code at the time of marking.

An editing method according to the present invention is adapted for editing a video material recorded on a recording medium. The editing method includes the steps of recording video data of an editing material onto the recording medium, recording a plurality of types of mark data at a position corresponding to the video data on the recording medium in response to the timing and operating state of operation by an operator, retrieving only a predetermined type of mark data selected from the plurality of type of mark data, and editing the editing material recorded on the recording medium by using the video data stored at the position corresponding to the retrieved mark data.

An image recording device according to the present invention includes recording means for recording a shot mark as an index for primary editing into a user's bit area on a time code track of a recording medium.

Also, an editing device according to the present invention includes: recording means for recording a shot mark as an index for primary editing into a user's bit area on a time code track of a recording medium; and control means for specifying a position traced back from the shot mark position by a first arbitrary period, as an editing start point, and specifying a position traced forward by a second arbitrary period, as an editing end point.

The editing device also includes operating means for indicating the shot mark position during reproduction of the recording medium. The control means specifies a second shooting start mark position traced back from the shot mark position, as an editing start point, and specifies a shooting start mark position immediately before, as an editing end point. The control means connects data from the editing start point to the editing end point at the time of automatic editing.

The editing device also includes operating means for indicating the shot mark position during reproduction of the recording medium. The control means specifies a position traced back by a first arbitrary period from the shot mark position of an odd ordinal number, as an editing start point, and specifies a position traced forward by a second arbitrary period from the shot mark position of an even ordinal number, as an editing end point. The control means connects data from the editing start point to the editing end point at the time of automatic editing.

The editing device also includes operating means for indicating the shot mark position during reproduction of the recording medium. The control means specifies a position traced back by a first arbitrary period from the shot mark position, as an editing start point, and specifies the shot mark position as an editing end point. The control means connects data from the editing start point to the editing end point at the time of automatic editing.

When a virtual shot mark position for editing is designated by the operating means, the control means of the editing device causes display means to display the virtual shot mark together with the shot mark. The control means also causes the display means to display a recording start mark of each scene.

The editing device may also have reproducing means for reproducing a shot mark as an index for primary editing, recorded in a user's bit area on a time code track of a recording medium.

An editing method according to the present invention includes the steps of recording a shot mark as an index for primary editing into a user's bit area on a time code track of a recording medium, and using a specified range prescribed with reference to the shot mark, as a portion to be used during editing of the recording medium, so as to connect the portion to be used.

In addition, a recording medium according to the present invention enables recording of a shot mark as an index for primary editing into a user's bit area on a time code track at time of recording video signals.

Also, the recording medium enables automatic recording of a recording start mark of each scene into the user's bit area on the time code track at the time of recording video signals.

BEST MODE FOR CARRYING OUT THE INVENTION

Figure 2:
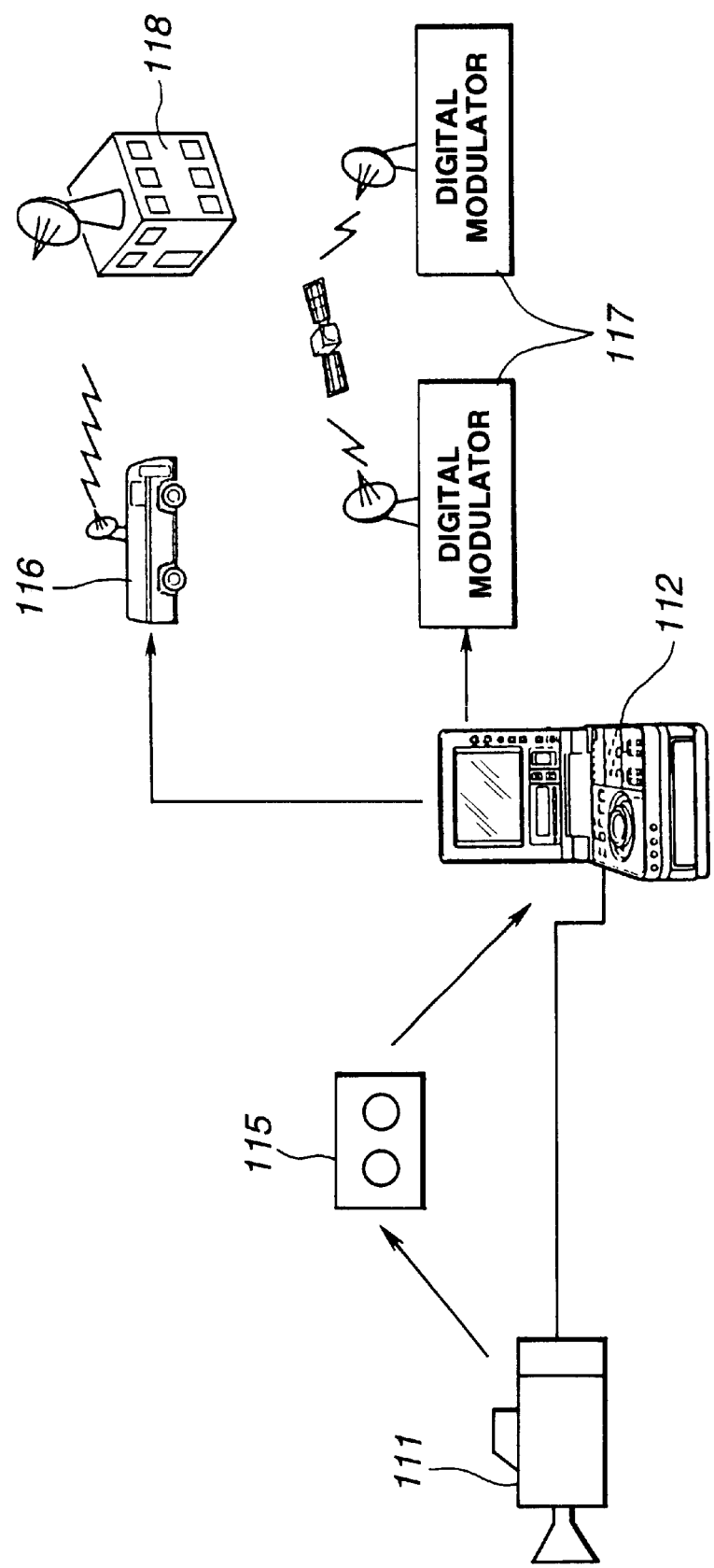
FIG. 2 shows an example of the structure of an editing system as an embodiment of the present invention.

Preferred embodiments of the editing system and method according to the present invention will now be described with reference to the drawings. This embodiment is an editing system as shown in FIG. 2, which includes a portable video tape recorder (VTR) with camera 111 and a portable editing device 112. This editing system enables a reporter himself/herself to operate the editing device 112 so as to edit video/audio data recorded on a tape cassette 115 by the VTR with camera 111, for example, at a reporting site. In the tape cassette 115, a video tape of a digital VTR format for D2 is wound. The editing system handles the video/audio material as digital data so as to carry out editing.

Video data, for example, for news broadcast produced by editing work using this editing system is transmitted at a high speed to a broadcasting station 118 by a mobile relay station 116 or a digital modulator 117 by utilizing a satellite circuit.

This editing system edits digital video data on the basis of the following embodiment of the editing method. In this embodiment of the editing method, a concept of good scene mark (GSM) as a mark for rough editing is introduced. The GSM includes a shot mark which may be appended at the time of shooting and an edit mark which may be appended at the time of editing. The shot mark is a mark which may be recorded onto a video tape as a cameraman presses a predetermined button while shooting a video material by using the VTR with camera 111. For example, a shot mark 1 may be recorded by pressing the predetermined button once, and a shot mark 2 given a lower priority than the shot mark 1 may be recorded by pressing the button twice. On the other hand, the edit mark is a mark which may be recorded onto the video tape as an editing operator presses a predetermined button of the editing device 112. As for the edit mark, too, an edit mark 1 and an edit mark 2 may be separately recorded, similarly to the above-mentioned shot marks 1 and 2. In the editing system, the reporter himself/herself is also the cameraman and the editing operator.

That is, the GSM is a mark recorded near a portion to be used on the video tape in order to specify a good scene at the time of recording, or recorded in order to specify a good scene at the time of editing. By pressing the predetermined button for a plurality of times, the portion to be used and cut out from the video material may be specified. Utilization of this GSM enables more simplified editing in rough editing.

To record the GSM directly onto the video tape of the digital VTR format, the GSM is recorded onto a time code track in a longitudinal track direction (longitudinal time code (LTC) track), as later described. Specifically, the GSM is recorded onto a user's bit in this time code track, which will be later described in detail.

For example, when a material tape on which shot marks are appended by the VTR with camera 111 is reproduced, fast fed (FF), or rewound (REW) by the editing device 112, each shot mark and a corresponding time code are read out and may be displayed on a display device. Also, necessary GSMs such as edit marks may be added from the editing device 112.

Figure 1:
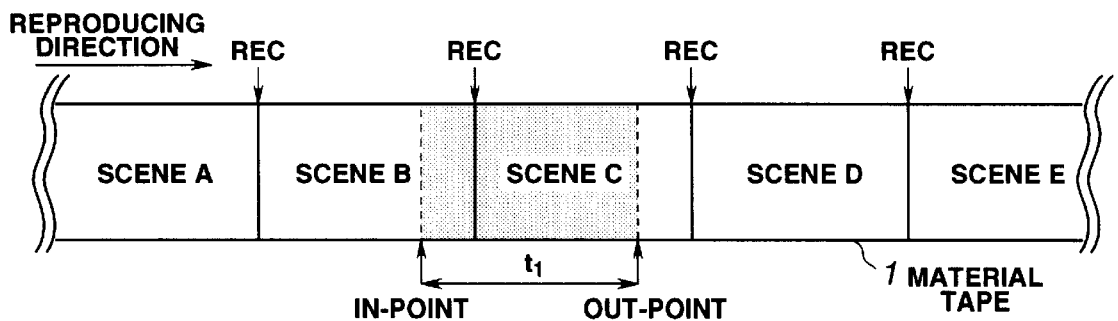
FIG. 1 is a view for explaining a conventional editing method.

By thus introducing the GSM, rough editing may be carried out by a very simply method, compared with the conventional editing method described with reference to FIG. 1. Such simplified editing method will now be described in comparison with the conventional editing method.

Figure 3:
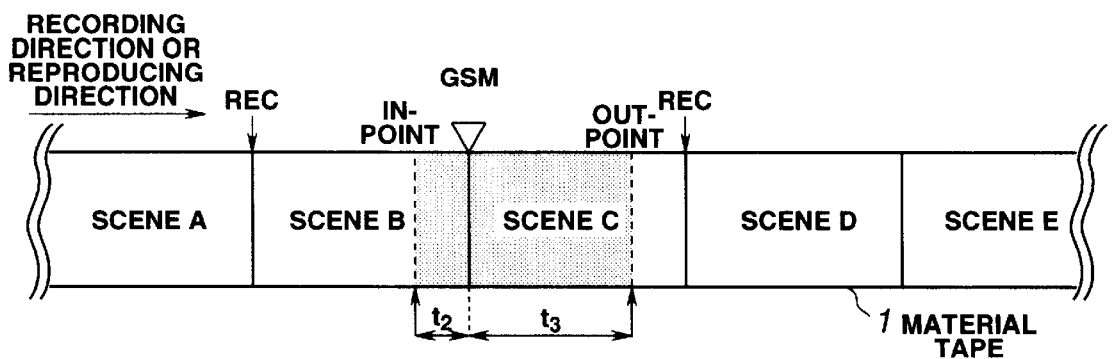
FIG. 3 shows a specific example of an editing method carried out by the editing system.

First, a first editing method is a method for retrieving a GSM while reproducing a material tape 1 at a high speed (or normally), and then directly shifting to a frame to which this GSM is appended, by cue-up operation, as shown in FIG. 3. The editing operator views images before and after the corresponding frame, and designates arbitrary times t2 and t3 so as to determine an IN-point and an OUT-point. This operation is carried out for each GSM. Finally, an edit decision list (EDL) as an editing list is generated from time codes of all the determined IN-points and OUT-points.

Figure 4A:
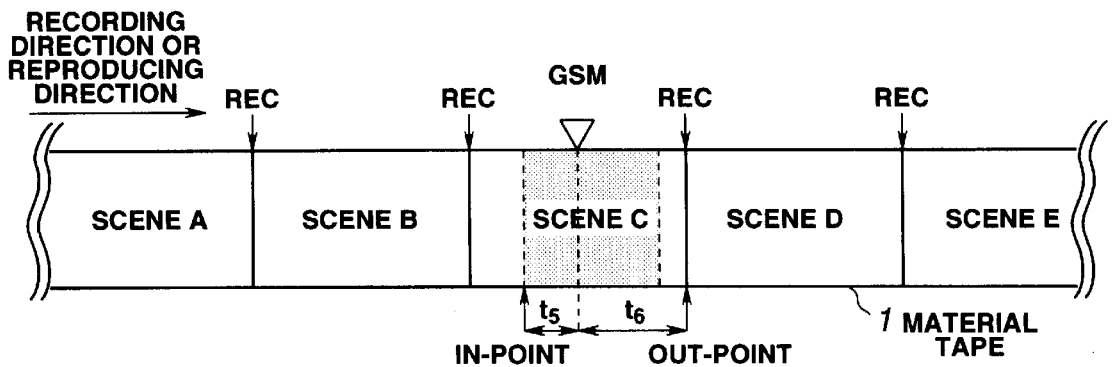
FIGS. 4A and 4B show two other specific examples of the editing method carried out by the editing system.

A second editing method is a method for retrieving a GSM while reproducing the material tape 1 at a high speed (or normally), and specifies a time code of an IN-point, a predetermined set time t5 before the time code having the GSM appended thereto, and a time code of an OUT-point, a predetermined set time t6 after the time code having the GSM appended thereto, as shown in FIG. 4A. This operation is carried out for each GSM. Finally, an EDL is generated from all the determined IN-points and OUT-points.

Figure 4B:
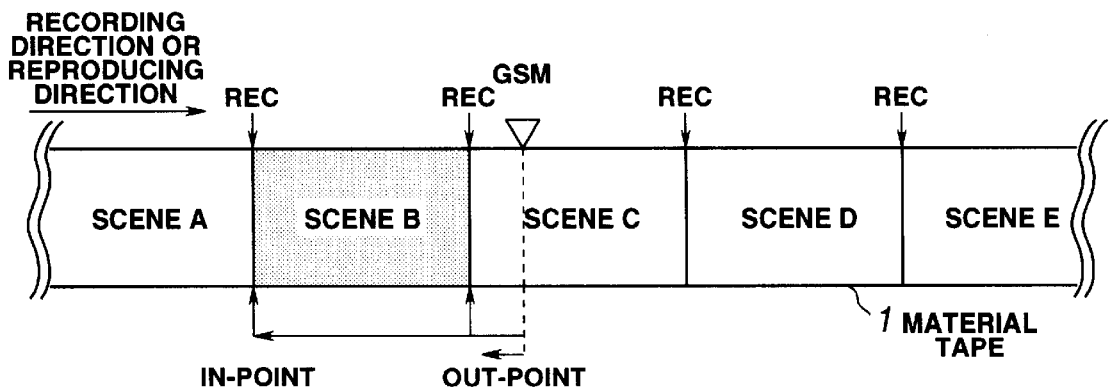

A third editing method is a method for retrieving a GSM while reproducing the material tape 1 at a high speed (or normally), and specifies a REC mark two marks before the GSM, as an IN-point, and a REC mark one mark before the GSM, as an OUT-point, as shown in FIG. 4B. This operation is carried out for each GSM. Finally, an EDL is generated from all the determined IN-points and OUT-points.

The video tape of the digital VTR format enables direct recording of the GSM thereon. On the longitudinal time code (LTC) track of this video tape, a time code signal modulated by a bi-phase mark system is recorded. The usage of 32 bits in total, as user's bits, of binary groups No. 1 to 8 in a SMPTE (Society of Motion Picture and Television Engineer time code) format of the time code track depends on the user. The GSM is recorded onto the user's bits.

Figure 5:
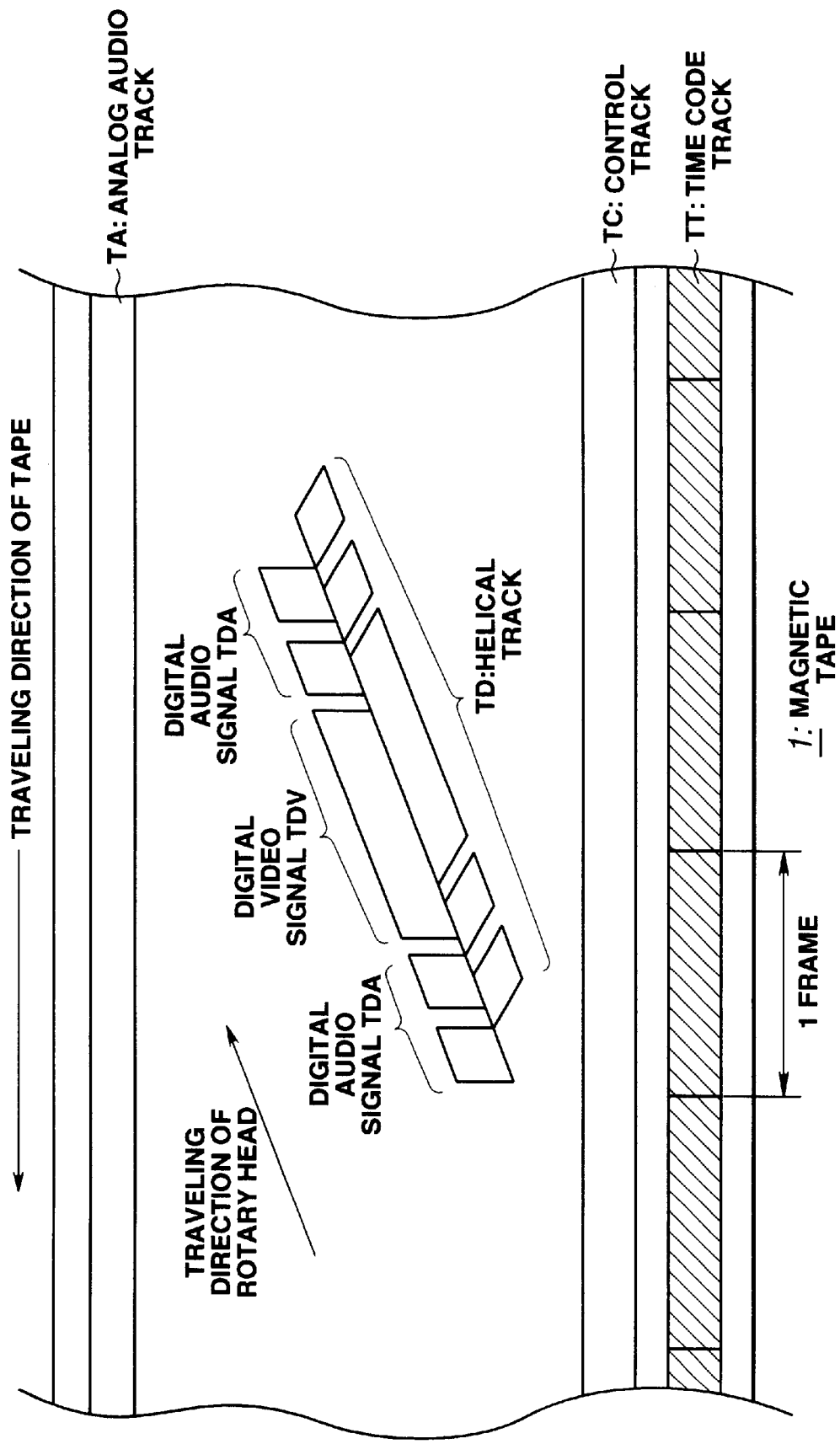
FIG. 5 is a view for describing a video tape for carrying out the editing method of the embodiment.

FIG. 5 shows an example of a tape pattern. In FIG. 5, a helical track TD having digital video and audio signals recorded thereon is generated at the center of a magnetic tape 1 by a rotary head. The helical track TD includes an area TDV where a digital video signal is recorded and an area TDA where a digital audio signal is recorded. On one edge of the magnetic tape 1, an audio track (longitudinal track) TA having an analog audio signal recorded thereon is generated by a fixed head. On the other edge of the magnetic tape 1, a control track (longitudinal track) TC having a control signal recorded thereon is generated by the fixed head. In addition, at a position adjacent to the control track, a time code track (longitudinal track) TT having a time code signal recorded thereon is generated by the fixed head.

Figure 6:
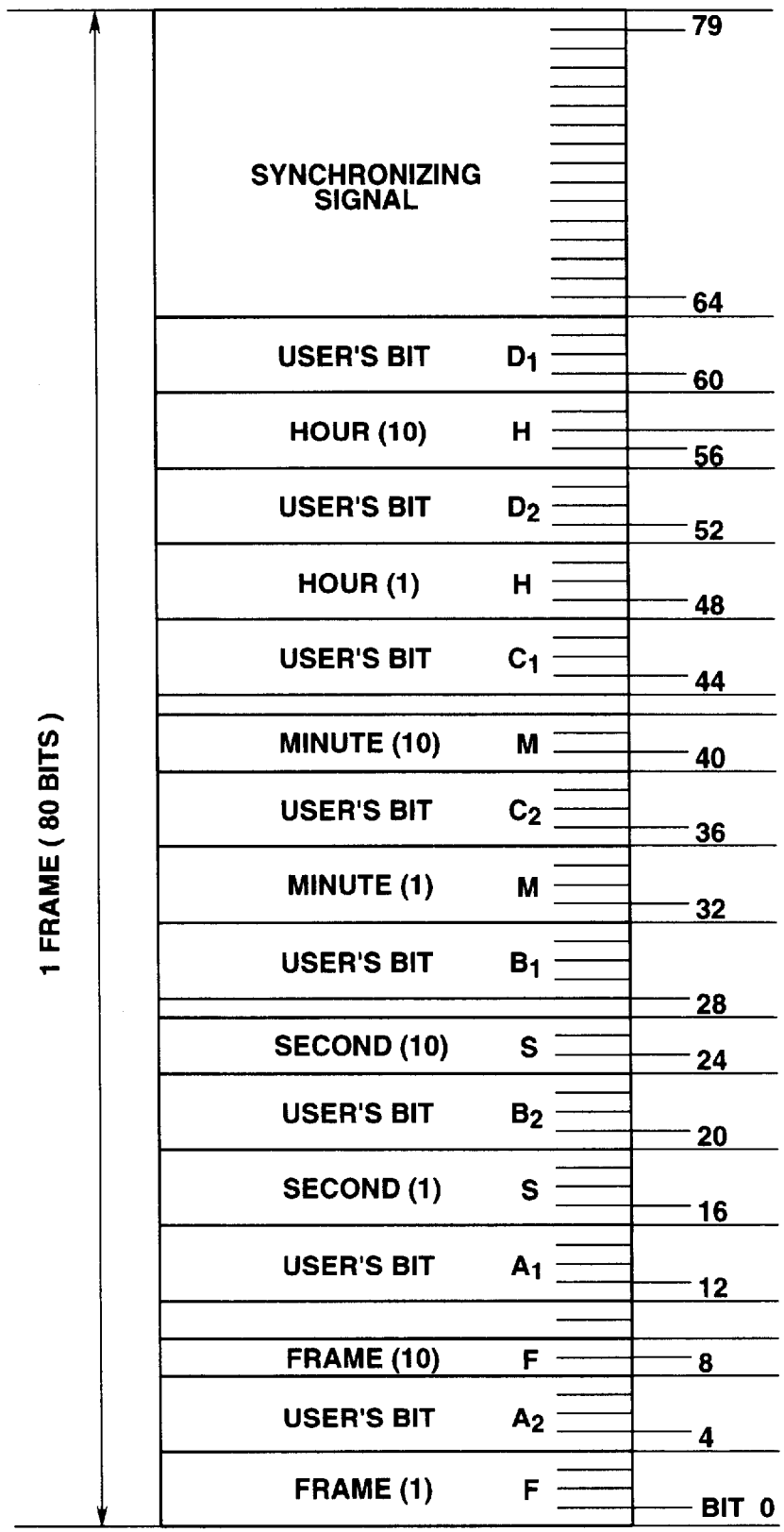
FIG. 6 shows an example of a format of a time code signal recorded on a time code track of the video tape of FIG. 5.

The time code signal (LTC) recorded on the time code track TT includes one frame area consisting of 80 bits as a unit, as shown in FIG. 6. This one frame area includes a synchronizing signal area for recording a synchronizing signal, eight time code recording bit areas for recording time codes (HH:MM:SS:FF), and eight user's bit recording areas for recording user's bits (D1D2:C1C2:B1B2:A1A2).

Specifically, "HOUR" information of the time codes is recorded in the two bit areas (H, H) expressed by bits 48 to 51 and bits 56 to 59. "MINUTE" information of the time codes is recorded in the two bit areas (M, M) expressed by bits 32 to 35 and bits 40 to 42. "SECOND" information of the time codes is recorded in the two bit areas (S, S) expressed by bits 16 to 19 and bits 24 to 26. "FRAME" information of the time codes is recorded in the two bit areas (F, F) expressed by bits 0 to 3 and bits 8, 9.

In the eight user's bit recording areas, a start code, a mark identification code, a data serial number code and a check sum code are recorded. The start code is recorded in the two bit areas (D1, D2) expressed by bits 60 to 63 and bits 52 to 55. The mark identification code is recorded in the two bit areas (C1, C2) expressed by bits 44 to 47 and bits 36 to 39. The data serial number code is recorded in the two bit areas (B1, B2) expressed by bits 28 to 31 and bits 20 to 23. The check sum code is recorded in the two bit areas (A1, A2) expressed by bits 12 to 15 and bits 4 to 7.

The start code is a code indicating that an area having the time code information recorded therein and the user's area start in one frame consisting of 80 bits. In the start code, data of "OFFh" is constantly recorded.

The mark identification code is a code for expressing the type of mark data. If a "REC start mark" is marked by the cameraman, "20h" is recorded as mark identification data. If a "shot mark 1" is marked by the cameraman, "21h" is recorded as mark identification data. If a "shot mark 2" is marked by the cameraman, "22h" is recorded as mark identification data. Also, if an "edit mark 1" is marked by the editing operator who operates the editing device, "23h" is recorded as mark identification data. If an "edit mark 2" is marked by the editing operator, "24h" is recorded as mark identification data.

This mark identification code is not only recorded only in one frame at the moment when the marking is designated by the cameraman or the editing operator, but also recorded continuously for 20 frames from the time when the marking is designated. For example, it is now assumed that the shot mark 1 is marked by the cameraman at a timing when the time code is expressed by "01:12:20:05". In this case, the data of "21h" is continuously recorded as the mark identification code onto this time code track, for 20 frames from the time code "01:12:20:02" at the moment when the marking is designated until a time code "01:12:20:24".

The reason for thus recording the same mark identification code continuously for 20 frames is that this mark identification code should be read out reliably. When information is to be reproduced from the time code track, read errors might be generated by data defects or bit errors of the tape. In such case, if the mark identification code is written only in the portion of the time code "01:12:20:05", there is a risk that the mark information cannot be obtained from the tape. Also, if the tape is caused to travel at a high speed, data of all the frames might not be retrieved because of the processing capability of hardware such as a CPU. In such case, too, if the mark identification code is written only in the portion of the time code "01:12:20:05", there is the risk that the mark information cannot be obtained from the tape and hence that an important scene cannot be retrieved.

However, according to the present invention, the same mark identification code is recorded for 20 frames from the timing of marking. Therefore, even if the mark identification code recorded in the first frame cannot be read out, the mark identification code can be reliably retrieved by reproducing the mark identification code recorded in the subsequent frame. In addition, even if the tape is caused to travel at such a high speed that data of all the frames on the time code track cannot be accessed, it suffices to enable reading of the mark identification code of at least one frame of the 20 frames. Therefore, the mark identification code can be reliably retrieved from the tape.

The data serial number code is data indicating the ordinal number of a frame from the leading end of the continuous 20 frames. For example, in the above-described example, "01" indicating that the frame is the first frame is recorded as the data serial number of the frame of the time code "01:12:20:05", and "20" indicating that the frame is the 20th frame is recorded as the data serial number of the frame of the time code "01:12:20:24".

The reason for thus recording the data serial number codes is that the time code of the first frame, that is, the time code at the time when the marking is made, should be obtained. For example, it is now assumed that data of the eighth frame may be read out from the data of the 20 frames recorded on the time code track, by high-speed reproduction with high-speed tape travel. The read out time code of the eighth frame is 01:12:20:12, and the data serial number code thereof is "08". From these two data, it is easily clarified that the first time code is "01:12:20:05".

Meanwhile, in the editing methods explained with reference to FIGS. 3 and 4, the shot marks 1 and 2 as GSMs are recorded by the VTR with camera 111. The edit marks 1 and 2 are recorded by the editing device 112. The structure and operation of the VTR with camera 111 and the editing device 112 will now be described.

First, the VTR with camera 111 will be described. The VTR with camera 111 includes shooting means for shooting an object, and recording means for recording video data of a video material shot by the shooting means onto a video cassette tape 115. Recording of the shot marks 1 and 2 is carried out by a recording/reproduction block shown in FIG. 7 including the recording means.

In this recording/reproduction block, an operating switch section 2 which is operated for setting an operation mode of recording or reproduction is connected to an operation control section 3. The operation control section 3 generates a motor control signal MC and a mode signal MS based on an operation mode signal CT set by the operating switch section 2.

The motor control signal MC is supplied to a motor control section 4, and the mode signal MS is supplied to a time code signal recording section 24, a time code signal reproducing section 31, a digital signal recording section 41, a digital signal reproducing section 42, an analog audio signal recording section 43, an analog audio signal reproducing section 44 and a monostable multivibrator (also referred to as "mono multi") 17.

A marker button 20 is a button to be pressed for recording the shot marks 1 and 2. When the marker button 20 is pressed once during recording of a video material, the shot mark 1 is recorded onto the magnetic tape 1 by a fixed head 25. When the marker button 20 is pressed twice, the shot mark 2 is recorded onto the magnetic tape 1 by the fixed head 25.

The operating switch section 2, the operation control section 3, the marker button 20, a signal modulating section 23 as later described, the time code signal recording section 24, and the fixed head 25 constitute shot mark recording means.

The motor control section 4 generates a motor driving signal MD based on the motor control signal MC supplied thereto. This motor driving signal MD is supplied to a capstan motor 5 and a drum motor 6, thereby causing the magnetic tape 1 to travel and rotating a rotary head section 7 having a plurality of heads.

A setting switch section 10 carries out setting of time and data (tape reel number or the like) to be recorded into the user's bit area, and setting as to whether to record shot mark data and recording start data or not. The setting switch section 10 supplies a setting signal SS to a data signal generating section 11 as pattern generating means.

The data signal generating section 11 generates time code data DT, user data DU, and specified patterns of recording start mark data DC and shot mark data DM, based on the setting signal SS from the setting switch section 10. The time code data DT thus generated is held by a time code data holding section 12 and is supplied to the signal modulating section 23. The user data DU is held by a user data holding section 13 and is supplied to a terminal a of a signal changeover switch 19. The recording start mark data DC is held by a recording start data holding section 14 and is supplied to a terminal a of a signal changeover switch 18. The shot mark data DM is held by a shot mark data holding section 15 and is supplied to a terminal b of the signal changeover switch 18.

The marker button 20 is a switch to be operated for recording the shot marks 1 and 2 onto the magnetic tape 1, as described above. When the marker button 20 is operated to supply an operation signal SG to a monostable multivibrator 21, a signal GW of a high level "H" is supplied from the monostable multivibrator 21 to the signal changeover switch 18 and an OR circuit 22 for a predetermined time period. The GSM signal GW controls the moving terminal of the signal changeover switch 18.

The monostable multivibrator 17 generates a mode timing signal MT of a high level "H" for a predetermined time period, when the operation mode shifts to recording operation on the basis of the mode signal MS. The mode timing signal MT is supplied to the OR circuit 22.

The OR circuit 22 takes a logical sum of the GSM signal GW and the mode timing signal MT, and supplies a logical sum signal MR to the signal changeover switch 19. The logical sum signal MR controls the moving terminal of the changeover switch 19.

The signal modulating section 23 automatically updates the time code data DT supplied from the time code data holding section 12. The updated time code data is modulated together with the data selected by the signal changeover switch 19 so as to become a recording time code signal WT of the above-described format. This recording time code signal WT is supplied to the time code signal recording section 24.

The time code signal recording section 24 converts the recording time code signal WT supplied thereto into a recording signal WS, and supplies the recording signal WS to the fixed head 25 on the basis of the mode signal MS supplied from the operation control section 3.

With the foregoing structure, the VTR with camera 111 enables recording of the shot marks 1 and 2 onto the magnetic tape 1. In addition, the VTR with camera 111 has signal reproducing means, which will now be described, and enables reproduction of the time code, the shot marks 1 and 2, and the recording start mark at the time of reproduction.

To the fixed head 25 constituting the signal reproducing means, the time code signal reproducing section 31 is connected. A reproducing signal RS from the fixed head 25 is converted into a reproduction time code signal RT and then supplied to a data separating section 32 constituting pattern detection means. The signal reproducing means is constituted by the fixed head 25 and the time code signal reproducing section 31. The data separating section 32, a user's bit area data holding section 34 as later described, a pattern comparing section 35, and a comparative pattern generating section 36 constitute the pattern detection means.

The data separating section 32 constitutes the pattern detection means and also constitutes time code reproducing means. The data separating section 32 separates the time code data DT and the user's bit area data DE from the reproduction time code signal RT. The time code reproducing means is constituted by the data separating section 32 and a time code data holding section 33. The separated time code data DT is supplied to the time code data holding section 33 and is temporarily held therein until next time code data DT is supplied. The time code data DT thus held is supplied to a data processing section (CPU) 37. The user's bit area data DE is held by the user's bit area data holding section 34. The user's bit area data DE held by the user's bit area data holding section 34 is supplied to the pattern comparing section 35 and the CPU 37.

In the CPU 37, a display section 38 is provided so that the GSM appended by the cameraman is displayed together with the time code thereof. If desired, the IN-point and the OUT-points specified by the GSM are displayed together with the time codes thereof.

The pattern comparing section 35 is connected with the comparative pattern generating section 36. The recording start mark data DC and shot mark data DG generated by the comparative pattern generating section 36 are compared with the user's bit area data DE supplied from the user's bit holding section 34, and a comparison signal CC indicating the result of comparison is supplied to the CPU 37.

On the basis of the comparison signal CC supplied from the pattern comparing section 35, when the recording start mark data DC and the user's bit area data DE coincide with each other, and when the shot mark data DG and the user's bit area data DE coincide with each other, the CPU 37 stores the time code data DT into a RAM. The stored time code data DT is supplied to the display section 38 as display means connected to the CPU 37, and is displayed together with the time code.

The digital signal recording section 41 converts digital video signals and audio signals into recording signals. The recording signals are supplied to the rotary head section 7 on the basis of the mode signal MS supplied from the operation control section 3, thus carrying out recording of signals onto the magnetic tape 1. Reproducing signals obtained from the rotary head section 7 by reproducing the magnetic tape 1 are supplied to the digital signal reproducing section 42 and then converted to digital video signals and audio signals.

The analog audio signal recording section 43 converts analog audio signals into recording signals. The recording signals are supplied to a fixed head 8 on the basis of the mode signal MS supplied from the operation control section 3, thus carrying out recording of signals onto the magnetic tape 1. Reproducing signals obtained from the fixed head 8 by reproducing the magnetic tape 1 are supplied to the analog audio signal reproducing section 44 and then converted to analog audio signals.

The operation will now be described. First, when the setting switch 10 is operated to carrying out setting of time and data to be recorded into the user's bit area, the data signal generating section 11 generates the time code data DT and user data DU in according with the setting. The time code data DT and the user data DU are held by the time code data holding section 12 and the user data holding section 13, respectively, and the data thus held are outputted from the time code data holding section 12 and the user data holding section 13.

When the setting switch 10 is operated to select the mode for recording the recording start mark data and the shot mark data, the data signal generating section 11 generates the recording start mark data DC and the shot mark data DG. The recording start mark data DC and the shot mark data DG are held by the recording start data holding section 14 and the shot mark data holding section 15, respectively, and the data thus held are outputted from the recording start data holding section 14 and the shot mark data holding section 15.

When the operating switch 2 is operated to start recording operation, the motor driving signal MD is supplied from the motor control section 4 to the capstan motor 5 and the drum motor 6 on the basis of the motor control signal MC outputted from the operation control section 3, thus starting tape travel and rotating the rotary head section 7.

Also, on the basis of the mode signal MS indicating recording operation outputted from the operation control section 3, the recording signals are supplied from the digital signal recording section 41 to the rotary head section 7, and digital video signals and audio signals are recorded onto the helical track TD shown in FIG. 5. The recording signals are supplied from the analog audio signal recording section 43 to the fixed head 8, and the audio signals are recorded onto the audio track TA.

In addition, as the mode signal MS indicating recording operation is supplied to the monostable multivibrator 17, the mode time signal MT of a high level "H" is outputted from the monostable multivibrator 17 for a predetermined period of time, and the moving terminal of the signal changeover switch 19 is turned to the side of the terminal b during the period in which the mode timing signal MT is at the high level "H".

When the marker button 20 is not operated, the signal level of the mark switch signal GW outputted from the monostable multivibrator 21 is a low level "L". Therefore, the moving terminal of the signal changeover switch 18 is located on the side of the terminal a, so that the recording start mark data DC is supplied to the signal modulating section 23. Also, since the mode signal MS indicating recording operation is supplied to the time code signal recording section 24, the recording signal WS generated on the basis of the updated time code data and recording start data DC is supplied to the fixed head 25. Thus, on the time code track TT shown in FIG. 5 of the magnetic tape 1, the time code data DT is recorded while being updated, and the recording start data DC is recorded.

Then, after the lapse of a predetermined time period, the mode timing signal MT is shifted to the low level "L" and the moving terminal of the signal changeover switch 19 is turned to the side of the terminal a. Therefore, the user data is supplied to the signal modulating section 23. Thus, on the time code track TT, the time code data DT is recorded while being updated, and the user data DU is recorded.

In this recording operation, if the marker button 20 is operated in recording an important scene during shooting by the video camera, since the GSM signal GW outputted from the monostable multivibrator 21 is shifted to the high level "H" for a predetermined period of time, the moving terminal of the signal changeover switch 18 is turned to the side of the terminal b. Also, since the GSM signal GW is shifted to the high level "H" for a predetermined period of time, the logical sum signal MR outputted from the OR circuit 22 is also shifted to the high level "H" for a predetermined period of time, and the moving terminal of the signal changeover switch 19 is turned to the side of the terminal b. Therefore, the GSM data DM is supplied to the signal modulating section 23 via the signal changeover switch 18, 19. On the time code track TT, the time code data DT is recorded while being updated, and the GSM data DM is recorded.

Then, after the lapse of a predetermined time period, the GSM signal GW is turned to the low level "L", and the moving terminals of the signal changeover switches 18, 19 are turned to the side of the terminals a, respectively. Therefore, the user data DU is supplied to the signal modulating section 23. On the time code track TT, the time code data DT is recorded while being updated, and the user data DU is recorded.

In this manner, the recording start data DC is recorded onto the time code track TT for a predetermined period of time from the start of recording operation, and when the marker button 20 is operated, the GSM data DM is recorded for a predetermined period of time instead of the user data DU.

In the following description, the magnetic tape having the recording start mark data and the shot mark data recorded on the time code track thereof is to be reproduced.

When the operating switch section 2 is operated to start reproducing operation, the tape is caused to start traveling and the rotary head section 7 is rotated. Since the mode signal MS indicating reproducing operation is outputted from the operation control section 3, reproducing signals obtained by scanning the helical track TD of the magnetic tape 1 by the rotary head section 7 are outputted as digital video signals and audio signals by the digital signal reproducing section 42. Reproducing signals obtained by scanning the audio track TA by the fixed head 8 are outputted as analog audio signals by the analog audio signal reproducing section 44.

Reproducing signals obtained by scanning the time code track TT by the fixed head 25 are converted to reproduction time code signals RT by the time code signal reproducing section 31, and the time code data DT and the user's bit area data DE are separated by the data separating section 32. When the pattern comparing section 35 detects that the separated user's bit area data DE is equal to the recording start mark data DC or the shot mark data DM, the time code data DT at this point is stored into the RAM of the CPU 37.

The data stored in the CPU 37 is displayed in a list by the display section 38, as a time value indicating the position on the magnetic tape 1 where the recording start mark data is recorded or as a time value indicating the position on the magnetic tape 1 where the shot mark data is recorded. Therefore, the recording start point on the magnetic tape 1 and the operating position of the shot mark operated for indicating that an important scene has been recorded may be easily grasped. Also, start and stop of reproducing operation may be easily controlled by using the data stored in the CPU 37.

The editing device 112 will now be described with reference to FIG. 8. This editing device 112 includes reproducing means for reproducing video data of the video material from the magnetic tape 1, and editing means for editing the video data of the video material on the magnetic tape 1 by using the video data reproduced by the reproducing means.

Figure 7:
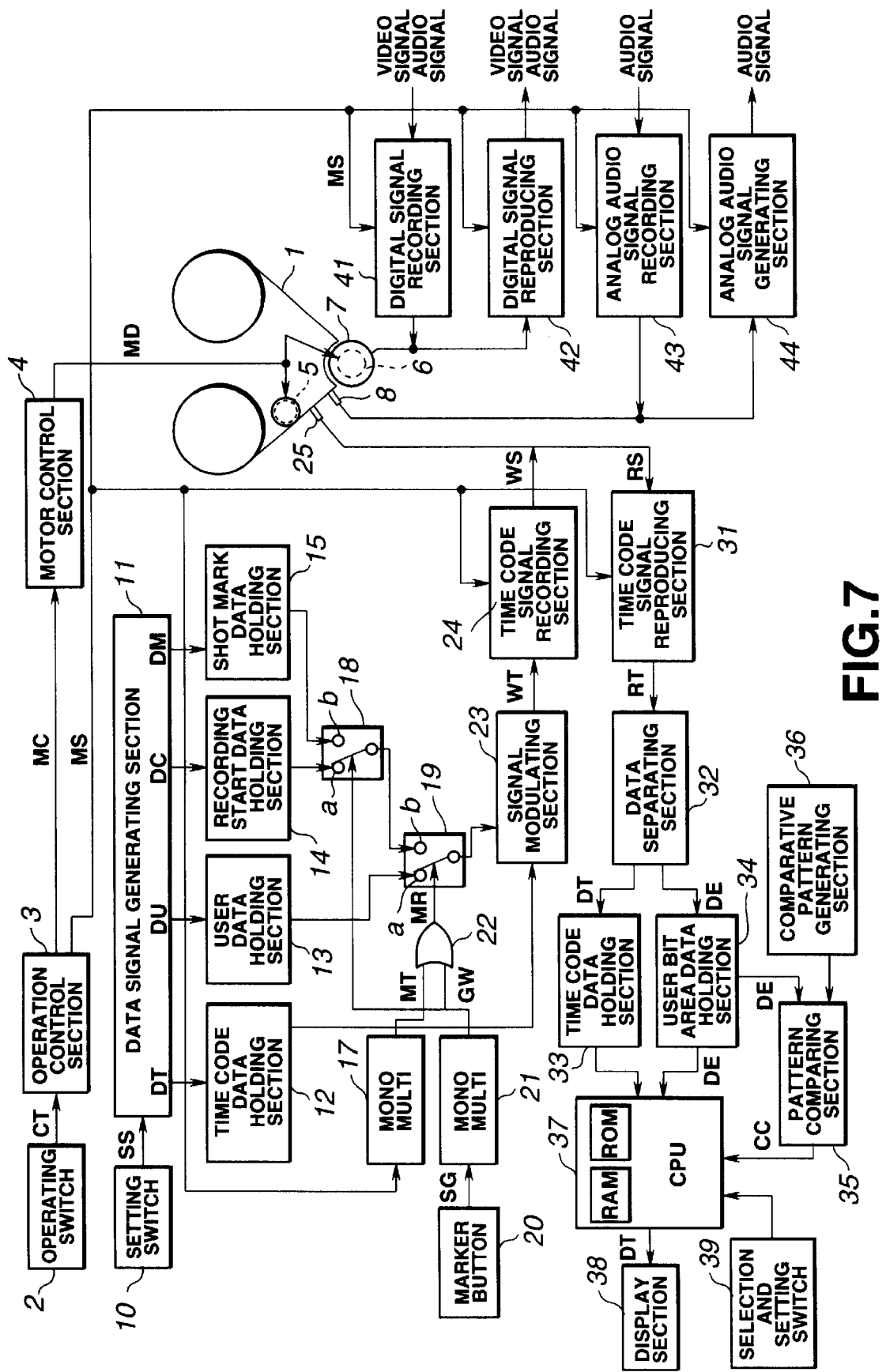
FIG. 7 is a block diagram showing the structure of a VTR with camera the editing system of FIG. 1.
Figure 8:
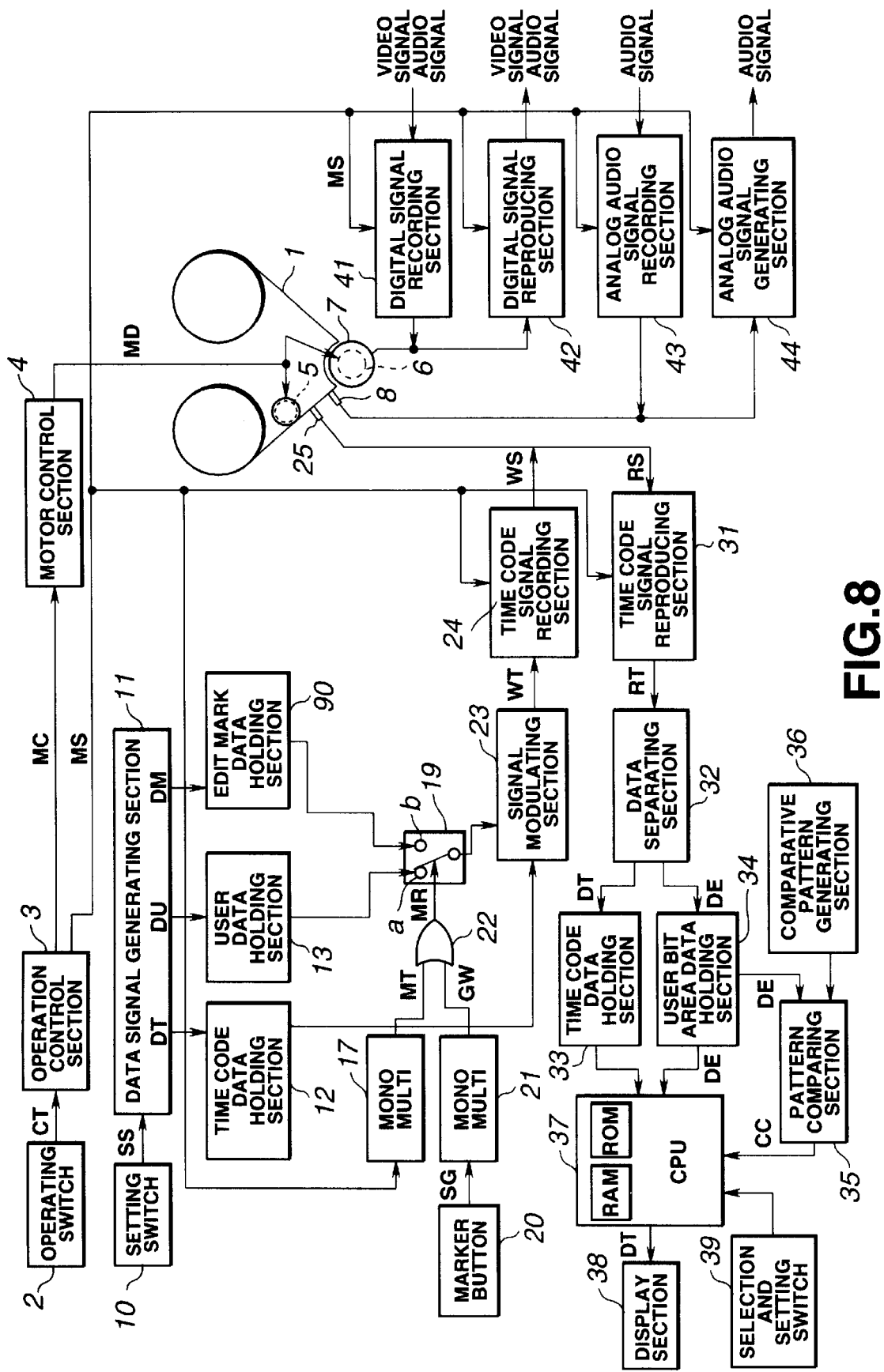
FIG. 8 is a block diagram showing the structure of an editing device constituting the editing system of FIG. 1.

The editing device 112 shown in FIG. 8 has a structure substantially the same as the recording/reproduction block of the VTR with camera 111 shown in FIG. 7. The editing device 112 largely differs from the recording/reproduction block in that a data signal generating section 11 generates data related to the edit marks 1 and 2. The editing device 112 also differs from the recording/reproduction block in that the recording start data DC is not generated and hence that the recording start data holding section 14 is not required. Therefore, the switch 18 is not required, either. The structure of each part around an edit mark data holding section 90 will now be described mainly.

A marker button 20 is a button to be pressed for recording the edit marks 1 and 2. If the marker button 20 is pressed once during reproduction of the magnetic tape 1 having the video material recorded thereon, the edit mark 1 is recorded onto the magnetic tape 1 by a fixed head 25. If the marker button 20 is pressed twice, the edit mark 2 is recorded onto the magnetic tape 1 by the fixed head 25. Positions where the edit marks 1 and 2 are recorded correspond to the video data recorded on the magnetic tape 1.

Edit mark recording means for recording the edit marks is constituted by an operating switch section 2, an operation control section 3, the marker button 20, a signal modulating section 23, a time code signal recording section 24, and the fixed head 25.

A setting switch section 10 carries out setting of time and data (tape reel number or the like) to be recorded into the user's bit area, and setting as to whether to record edit mark data or not. The setting switch section 10 supplies a setting signal SS to a data signal generating section 11 as pattern generating means.

The data signal generating section 11 generates time code data DT, user data DU, and edit mark data DM, based on the setting signal SS from the setting switch section 10. The time code data DT thus generated is held by a time code data holding section 12 and is supplied to the signal modulating section 23. The user data DU is held by a user data holding section 13 and is supplied to a terminal a of a signal changeover switch 19. The edit mark data DM is held by the edit mark data holding section 90 and is supplied to a terminal b of the signal changeover switch 19.

The marker button 20 is a switch to be operated for recording the edit marks 1 and 2 onto the magnetic tape 1, as described above. When the marker button 20 is operated to supply an operation signal SG to a monostable multivibrator 21, a signal GW of a high level "H" is supplied from the monostable multivibrator 21 to an OR circuit 22 for a predetermined time period.

A monostable multivibrator 17 generates a mode timing signal MT of a high level "H" for a predetermined time period, when the operation mode shifts to recording operation on the basis of the mode signal MS. The mode timing signal MT is supplied to the OR circuit 22.

The OR circuit 22 takes a logical sum of the GSM signal GW and the mode timing signal MT, and supplies a logical sum signal MR to the signal changeover switch 19. The logical sum signal MR controls the moving terminal of the changeover switch 19.

The signal modulating section 23 automatically updates the time code data DT supplied from the time code data holding section 12. The updated time code data is modulated together with the data selected by the signal changeover switch 19 so as to become a recording time code signal WT of the above-described format. This recording time code signal WT is supplied to the time code signal recording section 24.

The time code signal recording section 24 converts the recording time code signal WT supplied thereto into a recording signal WS, and supplies the recording signal WS to the fixed head 25 on the basis of the mode signal MS supplied from the operation control section 3.

The editing device 112 also has mark data reproducing means for reproducing the shot mark and the recording start mark recorded on the magnetic tape 1.

This signal reproducing means is constituted by the fixed head 25 and a time code signal reproducing section 31. A reproducing signal RS from the fixed head 25 is converted into a reproduction time code signal RT and then supplied to a data separating section 32 constituting pattern detection means.

To the fixed head 25 constituting the signal reproducing means, the time code signal reproducing section 31 is connected, and the reproducing signal RS from the fixed head 25 is converted into the reproduction time code signal RT and then supplied to the data separating section 32 constituting the pattern detection means. The signal reproducing means is constituted by the fixed head 25 and the time code signal reproducing section 31. The data separating section 32, a user's bit area data holding section 34 as later described, a pattern comparing section 35, and a comparative pattern generating section 36 constitute the pattern detection means.

The data separating section 32 constitutes the pattern detection means and also constitutes time code reproducing means. The data separating section 32 separates the time code data DT and the user's bit area data DE from the reproduction time code signal RT. The time code reproducing means is constituted by the data separating section 32 and a time code data holding section 33. The separated time code data DT is supplied to the time code data holding section 33 and is temporarily held therein until next time code data DT is supplied. The time code data DT thus held is supplied to a data processing section (CPU) 37. The user's bit area data DE is held by the user's bit area data holding section 34. The user's bit area data DE held by the user's bit area data holding section 34 is supplied to the pattern comparing section 35 and the CPU 37.

In the CPU 37, a ROM storing a program for carrying out each of the editing methods described with reference to FIGS. 3 and 4 and a RAM having a work area are enclosed. When editing operation is designated by the operating switch section 2 while any one of the editing methods is selected by a selection/setting switch 39, the program is transferred to the RAM.

In the CPU 37, a display section 38 is provided so that the GSM appended by the operator is displayed together with the time code thereof. If desired, the IN-point and the OUT-points specified by the GSM are displayed together with the time codes thereof.

The pattern comparing section 35 is connected with the comparative pattern generating section 36. The shot mark data and the edit mark data generated by the comparative pattern generating section 36 are compared with the user's bit area data DE supplied from the user's bit holding section 34, and a comparison signal CC indicating the result of comparison is supplied to the CPU 37.

On the basis of the comparison signal CC supplied from the pattern comparing section 35, when the recording start mark data DC and the user's bit area data DE coincide with each other, when the shot mark data DG and the user's bit area data DE coincide with each other, and when the edit mark data and the user's bit area data DE coincide with each other, the CPU 37 stores the time code data DT into the RAM. The stored time code data DT is supplied to the display section 38 as display means connected to the CPU 37, and is displayed together with the time code.

The operation of the editing device 112 will now be described. First, when the setting switch 10 is operated to carrying out setting of time and data to be recorded into the user's bit area, the data signal generating section 11 generates the time code data DT and user data DU in according with the setting. The time code data DT and the user data DU are held by the time code data holding section 12 and the user data holding section 13, respectively, and the data thus held are outputted from the time code data holding section 12 and the user data holding section 13.

When the setting switch 10 is operated to select the mode for recording the edit mark data, the data signal generating section 11 generates the edit mark data DM. The edit mark data DM is held by the edit mark data holding section 90 and is outputted from the edit mark data holding section 90.

When the operating switch 2 is operated to start editing operation, the motor driving signal MD is supplied from the motor control section 4 to the capstan motor 5 and the drum motor 6 on the basis of the motor control signal MC outputted from the operation control section 3, thus starting tape travel and rotating the rotary head section 7.

Also, on the basis of the mode signal MS indicating recording operation outputted from the operation control section 3, video signals of the video material are outputted from the digital signal reproducing section 42.

In addition, when recording of the edit mark is set during editing operation so that the mode time signal MT of a high level "H" is outputted from the monostable multivibrator 17 for a predetermined period of time, the moving terminal of the signal changeover switch 19 is turned to the side of the terminal b during the period in which the mode timing signal MT is at the high level "H".

In this editing operation, if the marker button 20 is operated once, the GSM signal GW outputted from the monostable multivibrator 21 is shifted to the high level "H" for a predetermined period of time. Since the GSM signal GW is shifted to the high level "H" for a predetermined period of time, the logical sum signal MR outputted from the OR circuit 22 is also shifted to the high level "H" for a predetermined period of time, and the moving terminal of the signal changeover switch 19 is turned to the side of the terminal b. Therefore, the shot mark data DM related to the edit mark 1 is supplied to the signal modulating section 23 via the signal changeover switch 18, 19. On the time code track TT, the time code data DT is recorded while being updated, and the shot mark data DM of the edit mark 1 is recorded.

In the following description, the magnetic tape having the recording start mark data and the shot mark data recorded on the time code track thereof by the editing device 112 is to be reproduced.

When the operating switch section 2 is operated to start editing operation, the tape is caused to start traveling and the rotary head section 7 is rotated. Since the mode signal MS indicating reproducing operation is outputted from the operation control section 3, reproducing signals obtained by scanning the helical track TD of the magnetic tape 1 by the rotary head section 7 are outputted as digital video signals and audio signals by the digital signal reproducing section 42. Reproducing signals obtained by scanning the audio track TA by the fixed head 8 are outputted as analog audio signals by the analog audio signal reproducing section 44.

Reproducing signals obtained by scanning the time code track TT by the fixed head 25 are converted to reproduction time code signals RT by the time code signal reproducing section 31, and the time code data DT and the user's bit area data DE are separated by the data separating section 32. When the pattern comparing section 35 detects that the separated user's bit area data DE is equal to the recording start mark data DC or the shot mark data DM, the time code data DT at this point is stored into the RAM of the CPU 37.

The data stored in the CPU 37 is displayed in a list by the display section 38, as a time value indicating the position on the magnetic tape 1 where the recording start mark data is recorded, or as a time value indicating the position on the magnetic tape 1 where the shot mark data 1 and 2 are recorded, or as a time value indicating the position on the magnetic tape 1 where the edit mark data 1 and 2 are recorded, as later described.

Therefore, the recording start point on the magnetic tape 1 and the position where the shot marks 1 and 2 or the edit marks 1 and 2 are designated may be easily grasped. Also, start and stop of reproducing operation may be easily controlled by using the data stored in the CPU 37. That is, by designating each mark, the corresponding video material may be easily accessed by cue-up operation.

In the case where all the marks are designated, or in the case where one mark, for example, only the shot mark 1 is designated, the CPU 37 of the editing device 112 displays on the display section 38 the video data of all the time codes where the designated marks are recorded.

Figure 9:
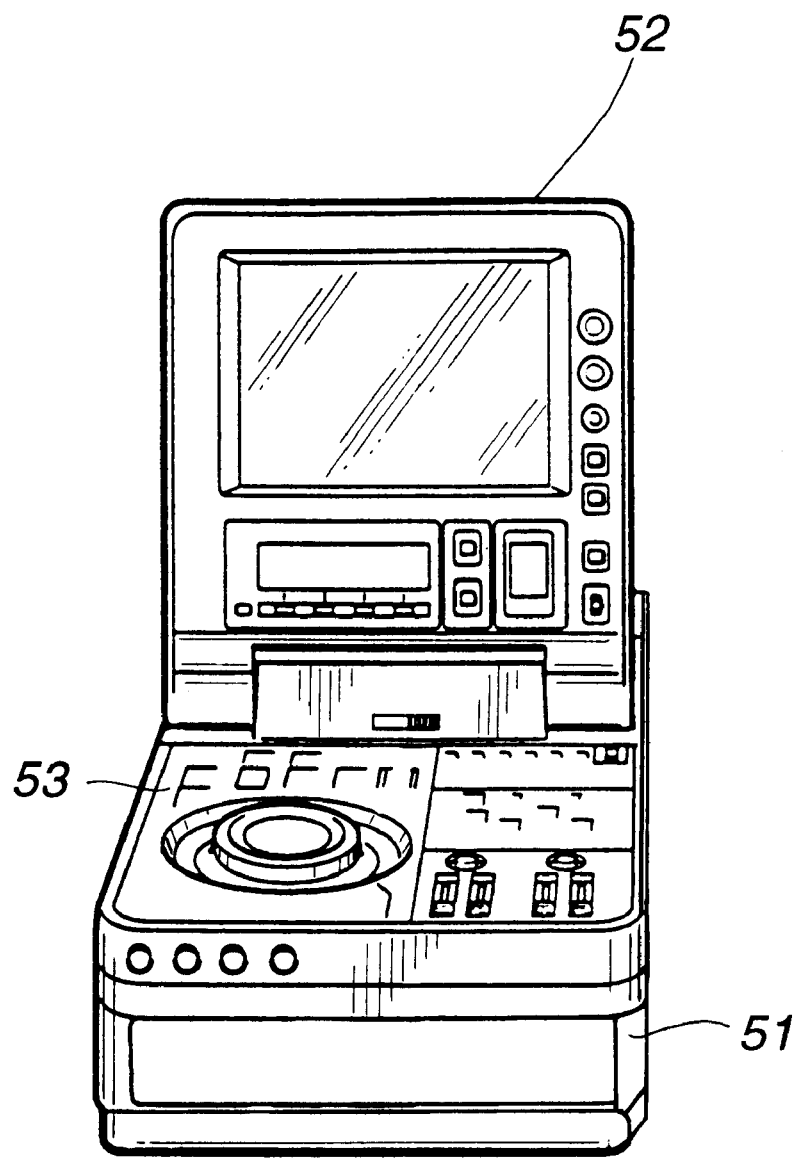
FIG. 9 is a perspective view showing the appearance of the editing device of FIG. 8.

FIG. 9 shows a perspective view of appearance of a specific example of the editing device 112. A body 51 of the editing device includes a display panel 52 and an operating panel 53. A recording/reproduction block is housed in a lower part of the operating panel 53.

Figure 10:
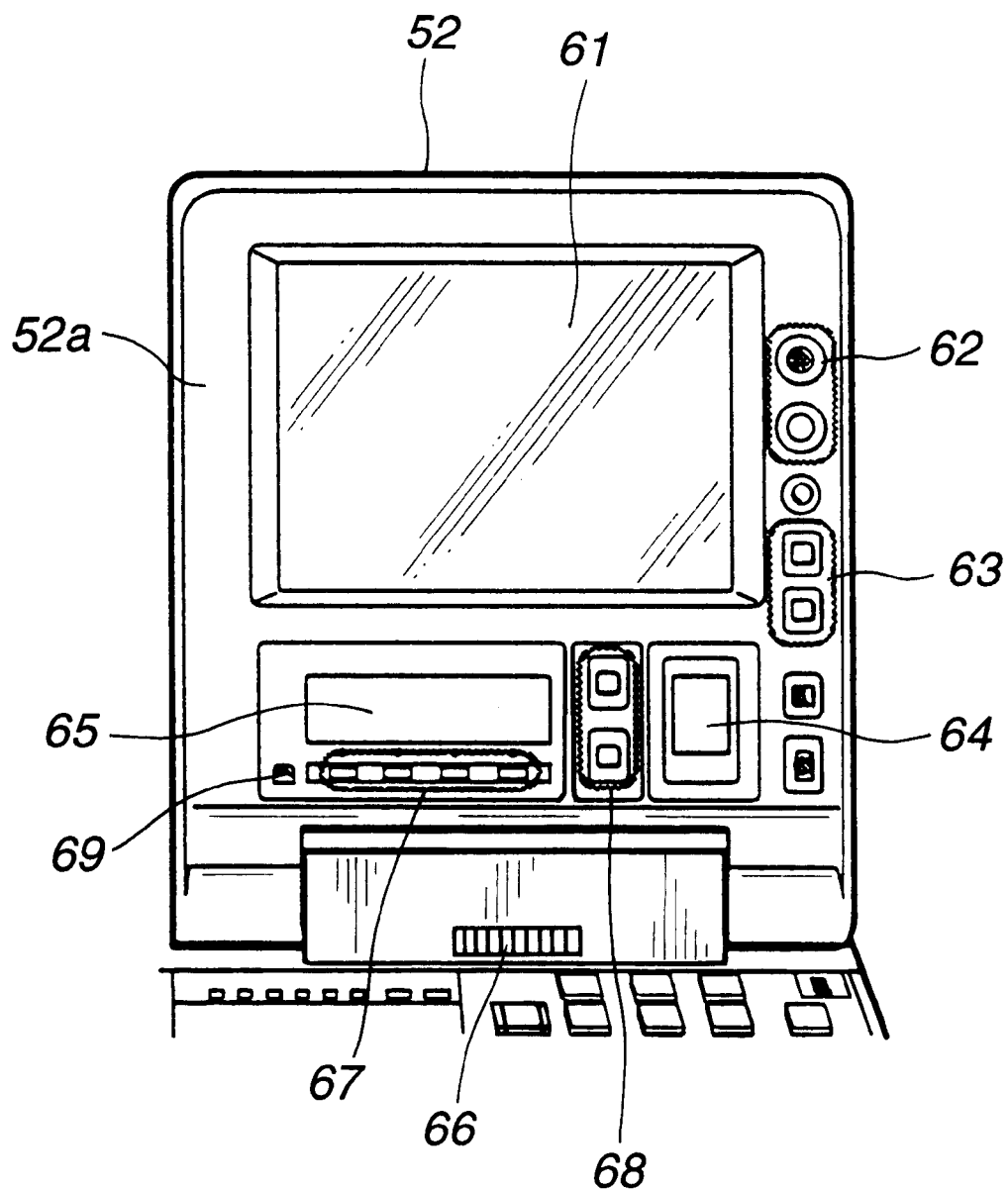
FIG. 10 shows a display panel of the editing device of FIG. 9.

FIG. 10 shows the display panel 52 of the editing device. On a front side 52 of the display panel 52, a liquid crystal display (LCD) monitor 61 for displaying a reproducing image for editing or displaying a shot mark list as later described is provided. This LCD monitor 61 is equivalent to the display section of FIG. 8. Also, a bright/contrast knob 62, a time code operating button 63, an audio level meter 64, a sub-LCD 65, and an audio monitor speaker 66 are provided on the display panel 52. On the periphery of the sub-LCD 65, a plurality of operating buttons 67 for, for example, setting desired items of a home page, an up/down button 68 for changing the setting, and a page designating button 69 are provided, as shown in FIG. 10.

Figure 11:
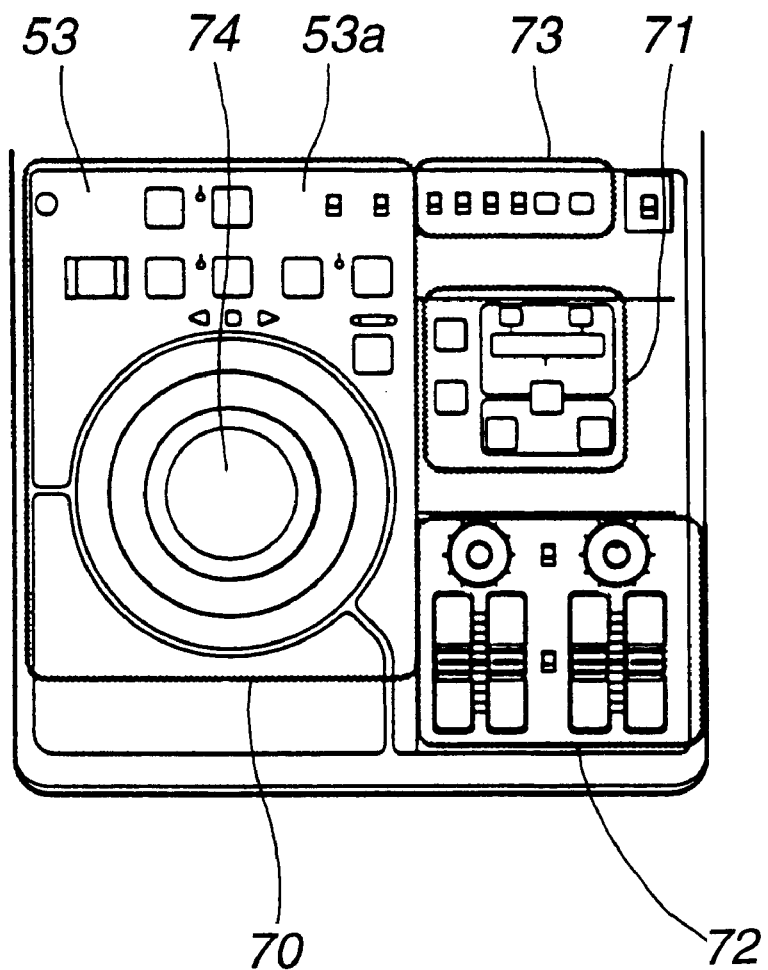
FIG. 11 shows an operating panel of the editing device of FIG. 9.

FIG. 11 shows the operating panel 53 of the editing device. On an upper side 53a of the operating panel 53, a tape traveling system control section 70, an editing operation section 71, an audio control section 72, a time code/setup menu operating section 73, a jog/shuttle dial 74 and the like are provided.

In such editing device or in the above-described VTR with camera, the concept of GSM is introduced and the single marker button 20 is operated, thus easily enabling simplified editing. This GSM setting operation is adapted for roughly determining a portion to be used, and the cameraman or the editor can intuitively understand the operation.

By such rough editing, for example, the cameraman may carry out simplified editing at the side and send to the broadcasting station only a portion having a high probability of being used for broadcast.

Thus, with the video tape of the digital VTR format, the shot mark may be recorded directly onto the magnetic tape during shooting of the image of the material with the VTR with camera. Also, in the editing device, the edit mark may be directly recorded during reproduction of the image of the material recorded on the VTR tape. In accordance with this edit mark, ultimate editing work may be easily carried out.

According to this invention, since the shot mark data and the edit mark data may be recorded into the user's bit area on the time code track formed in the longitudinal direction of the tape-like recording medium, a threaded recording position or a mark position may be easily detected by detecting the data.

Also, since the recording information is patterned, the recording information may easily detected by detecting the pattern at the time of reproduction. In addition, when the operating means is operated, for example, when the operating switch section 2 is operated to start recording operation, or when the marker button 20 is operated, a specified pattern indicating threaded recording or a specified pattern indicating that the marker button 20 is operated is automatically recorded for a predetermined period of time. Therefore, the recording operation of the recording information may be facilitated.

Moreover, in the signal recording/reproducing device, the signal recorded in the user's bit area is reproduced by the signal reproducing means, and the specified pattern indicating the recording information is detected from the reproducing signal by the pattern detection means. Then, the position on the tape-like recording medium where the recording information is recorded is automatically detected. The time code data at the time when the specified pattern is detected is recorded onto the memory means, and the recorded time code data is displayed as the time value in a list on the display means. Therefore, the editing work may be carried out efficiently and easily by utilizing the time value indicating the recording information displayed on the display means. Also, the reproducing operation may be controlled by utilizing the time code data recorded on the memory means.

In addition, in the editing device and method according to the present invention, the function to read the GSM recorded on the video tape of the digital VTR format and display the GSM in a list on the LCD display section 61 constituting the display section 38 of FIGS. 7 and 8 is appended.

The GSM is exemplified by the recording start mark, the shot mark and the edit mark recorded on the video tape, as described above. These GSMs may be stored together with the time code of the mark position by tape rewind or fast feed operation of the recording device or the editing device, and may be displayed in a list on the display section 38 (61) as a mark list.

Also, the edit mark may include the virtual shot mark. When a desired scene is found during the play/search mode, the appended mark is defined as a virtual shot mark. The virtual shot mark is stored together with the time code similarly to the edit mark, and is displayed in the mark list. Any number of virtual shot marks may be stored until the memory becomes full.

Thus, first, the video tape is reproduced and a virtual shot mark is appended. Then, the position of the mark is quickly accessed.

The recording start mark is a mark to be recorded at the start of shooting or at the start of recording from interrupt. Triggered by the start of LTC recording, the recording start mark is immediately recorded onto the time code track TT.

The shot mark data 1 is recorded one second after the reception of the trigger, as the marker button 20 is pressed once during recording. The shot mark button 2 is recorded one second after the reception of the first trigger, as the marker button 20 is pressed twice or more during recording.

The recording start mark and the two shot marks are written continuously for 20 frames in order to deal with errors at the time of reading, as described above.

The virtual shot mark defined as the edit mark will be described later.

Meanwhile, the CPU 37 of the editing device 112 generates a list based on the mark data. This list is also stored in the RAM and is retained even when the power is turned off.

Figure 12:
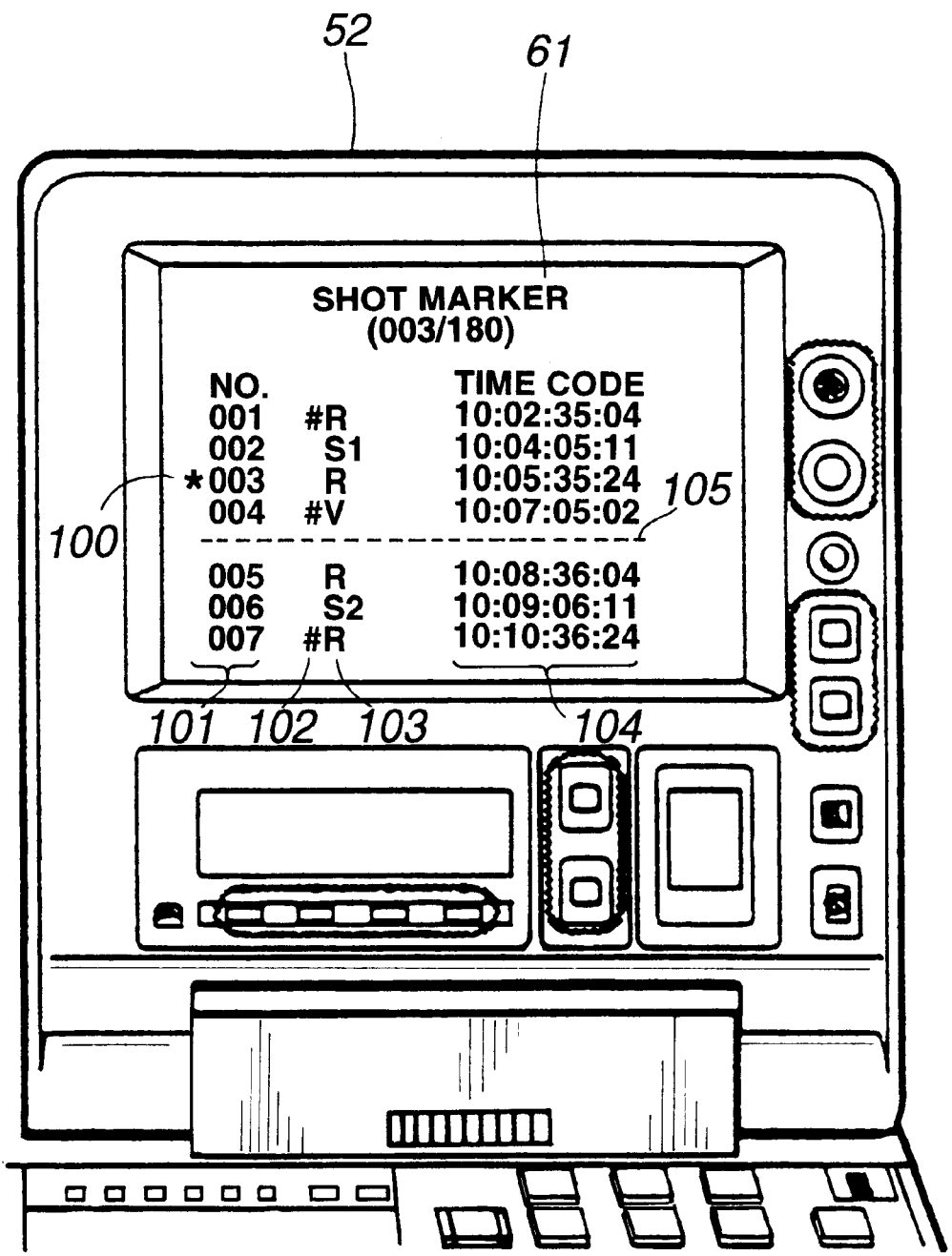
FIG. 12 shows a mark list on a display section of the editing device of FIG. 11.

The list is displayed on the LCD display section 61 as shown in FIG. 12. In FIG. 12, a selection mark/cue-up mark 100 may be selected by a jog dial 74, similarly to the menu. When a pre-roll button 77 is pressed in the state where the marking is made, the time code may be accessed by cue-up operation. A shot mark number 101 is a prepared number, and numbers which can be stored are allocated in advance, for example, 1 to 200.

A memo mark 102 is used for a memorandum of the editor and is appended on the right side of the shot mark number. By pressing a "SET" button in the state where the selection mark is displayed, the memo mark 102 is displayed. To eliminate the memo mark 102, the "SET" button may be pressed once again. The number of memo marks 102 is not limited, and the memo marks 102 may be appended to arbitrary shot marks on the list.

A mark type 103 indicates the type of a mark. R indicates the recording start mark. S1 indicates the shot mark 1 and S2 indicates the shot mark 2. S2→S3 indicates an additional shot mark and V indicates the virtual shot mark as later described.

A time code 104 is a time code of the position where each mark exists. A separator display 105 is displayed when the shot mark is newly read after interrupt of reading.

The total number of mark lists shown on the LCD display section 61 of FIG. 12 is displayed in the form of mark number/total number of marks (003/180) in the second row. When cue-up operation is started, the list disappears.

As described above, when the pre-roll button 77 is pressed in the state where the selection mark/cue-up mark 100 is appended, the time code may be accessed by cue-up operation. Also, the nearest shot mark may be accessed by cue-up operation.

In addition, in this recording/reproducing device, the CPU 37 newly adds the shot mark as the virtual shot mark onto the list by simultaneously pressing an entry button of the setting switch 10 and the marker button 20 during the play mode or the jog/shuttle mode (search mode).

On carrying out addition of the virtual shot mark, the CPU 37 displays, for example, "shot mark in" for three seconds on the lower part of the sub-LCD 65 constituting the display section 38.

When time code insert is enabled, the shot mark is actually recorded onto the tape. However, when time code insert is disabled, the shot mark is only added to the list. The former is referred to as an additional shot mark, and the latter as a virtual shot mark. The list need not be opened during these operations. The additional shot mark is recorded onto the tape, by pressing the marker button 20 for three seconds or more so as to enable mark input and then simultaneously pressing the marker button and the entry button when the entry button flashes.

By thus using, as the editing device, the recording/reproducing device which has the functions to display the mark list, append the virtual mark and carry out cue-up access to the virtual mark, a desired point may be accessed from the list by cue-up operation. Then, the vicinity of the desired point ,may be checked by jog/shuttle search, and a scene which is considered necessary may be registered by IN/OUT operation. After that, the list is accessed once again, and another necessary editing point is determined by the same operation. Finally, a plurality of editing points may be registered.

By designating a plurality of edit marks, the shot mark and the recording start mark on the list, the recording position of the video data to which each mark is appended may be accessed by cue-up operation. For example, if only the shot mark 1 is designated, all the video data to which the shot mark 1 is appended may be accessed by cue-up operation. Also, if only the edit mark 1 is designated, all the video data to which the edit mark 1 is appended may be accessed by cue-up operation. At this point, the time code is displayed as a matter of course. If all the marks are designated, all the video data to which the marks are appended may be displayed together with the time codes.

The above-described operation is carried out on the side of the reproducing device, and is held during reproduction as a multi-event for editing.

Automatic editing from the recording device, in the case where the multi-event is registered by the above-described method on the side of the reproducing device, is normally carried out. By making a request for calling the next event, if any, from the recording device after the automatic editing is carried out, multi-event editing may be carried out.

Figure 13:
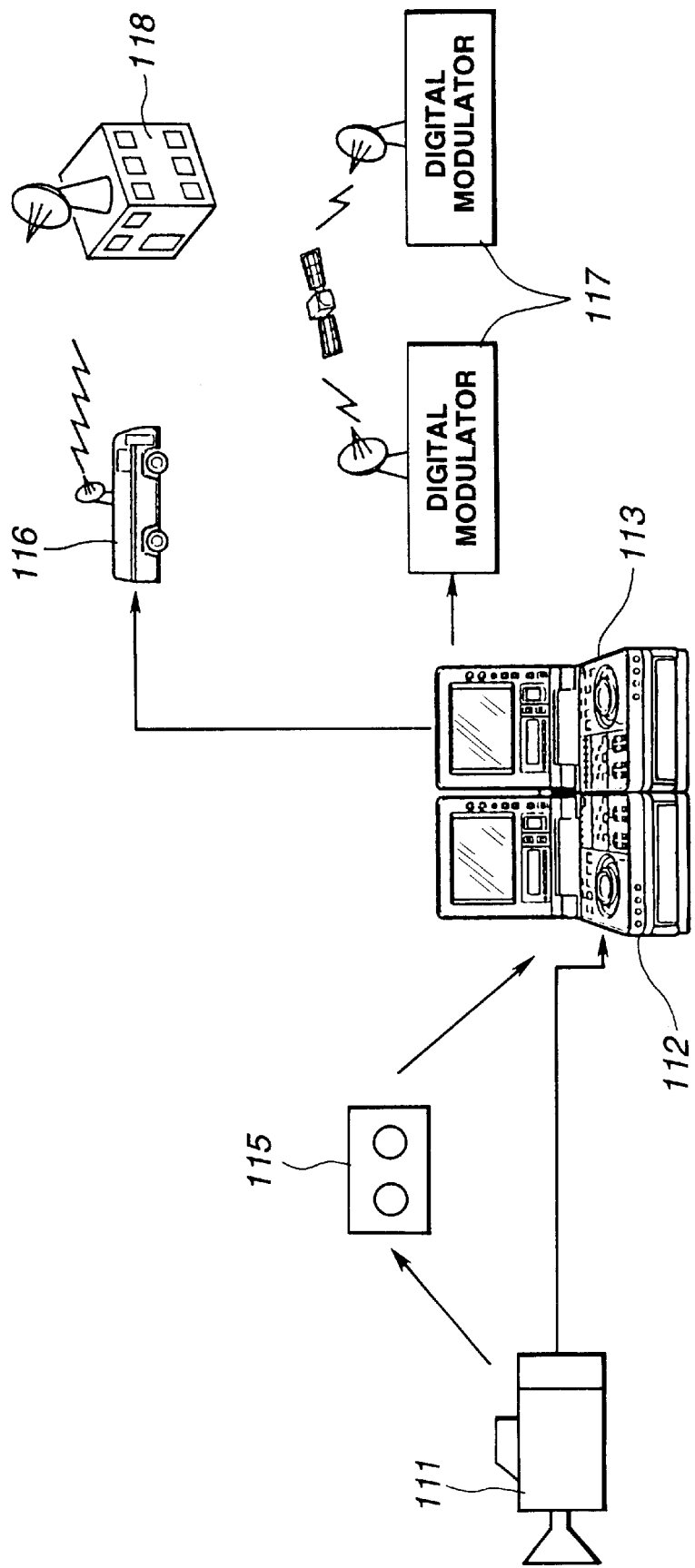
FIG. 13 shows a specific example of an editing system using two editing devices shown in FIGS. 8 and 9.

FIG. 13 shows the structure of a system for carrying out video editing by using two units of the above-described editing device 112. Specifically, in this editing system, two editing devices 112, 113 are operated to edit images/sounds recorded on the tape cassette 115 of the VTR with camera 111.

Figure 14:
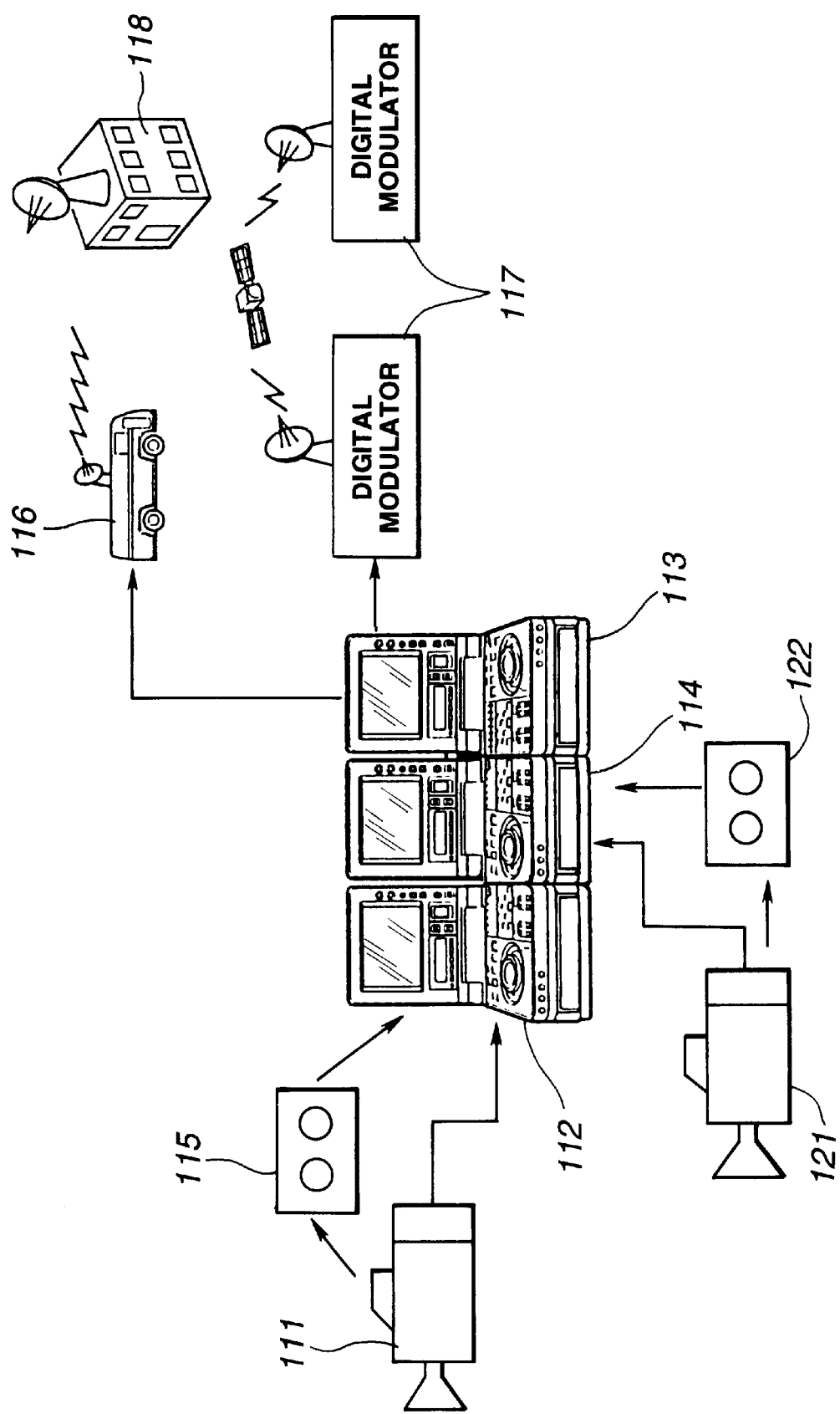
FIG. 14 shows a specific example of an editing system using three editing devices shown in FIGS. 8 and 9.

FIG. 14 shows the structure of a system for carrying out video editing by using three editing devices 112, 113 and 114.

In this editing system, a source A obtained by reproducing images/sounds recorded by the VTR with camera 111, by the editing device 112, and a source B obtained by reproducing images/sounds recorded by a VTR with camera 121, by the editing device 114, are edited by the editing device 113.

What is claimed is:

1. An editing system for editing a video material recorded on a tape-like recording medium, the editing system comprising:

a video camera having shooting means for shooting an object, and recording means for recording video data of a video material shot by the shooting means onto the recording medium; the recording means having first mark data recording means for recording first mark data at a position corresponding to the video data on the recording medium in response to a marking operation by an operator; the first mark data being recorded onto a time code track arranged in a longitudinal direction of the tape-like recording medium at the same time as the video data is being recorded onto a helical track of the tape-like recording medium; and an editing device having reproducing means for reproducing the video data of the video material from the recording medium and editing means for editing the video data of the video material on the recording medium by using the video data reproduced by the reproducing means; the editing device having second mark data recording means for recording second mark data of a type different from that of the first mark data, onto the time code track of the tape-like recording medium having the video data already recorded on the helical track thereof;

each time code track corresponds to one frame of the video data and includes a synchronizing signal recording area for recording a synchronizing signal, a plurality of time code recording bit areas for recording the time code, and a plurality of user's data recording bit areas; the plurality of user's data recording areas include a first bit area for recording a start code indicating a start position of the user's data, a second bit area for recording an identification code of the mark data, a third bit area for recording a serial number code expressing a serial number of the mark data, and a fourth bit area for recording check data for checking the start code, the mark identification code and the serial number code;

the reproducing means of the editing device having mark data reproducing means for reproducing the first mark data and the second mark data recorded on the recording medium; the first mark data being a shot mark and the second mark data being an edit mark;

the editing means of the editing device editing the video material recorded on the recording medium by using the first mark data and the second mark data reproduced by the mark data reproducing means.

2. The editing system as claimed in claim 1, wherein in the second bit area, the same mark data identification code is recorded over a predetermined frame period of the video data.

3. The editing system as claimed in claim 2, wherein the serial number code recorded in the third bit area indicates a recording position of the mark data reproduced by the mark data reproducing means, in the predetermined frame period.

4. The editing system as claimed in claim 3, wherein the mark data reproducing means reproduces all data recorded on the time code track, and wherein the editing means refers to the serial number code reproduced by the mark data reproducing means, thereby calculating a time code corresponding to mark data recorded first of the mark data recorded over the predetermined number of frames so as to recognize the calculated time code as a time code at the time of marking by the operator.

5. An editing system for editing a video material recorded on a tape-like recording medium, the editing system comprising:

recording means for recording video data as an editing material onto the recording medium, and recording mark data onto a time code track arranged in a longitudinal direction of the tape-like recording medium at a position corresponding to the video data on the recording medium in response to the timing of operation by an operator;

each time code track corresponds to one frame of the video data and includes a synchronizing signal recording area for recording a synchronizing signal, a plurality of time code recording bit areas for recording the time code, and a plurality of user's data recording bit areas; the plurality of user's data recording areas include a first bit area for recording a start code indicating a start position of the user's data, a second bit area for recording an identification code of the mark data, a third bit area for recording a serial number code expressing a serial number of the mark data, and a fourth bit area for recording check data for checking the start code, the mark identification code and the serial number code;

reproducing means for retrieving the mark data recorded on the recording medium while reproducing the video data from the recording medium at a high speed; the reproducing means retrieving the mark data at a high speed by reproducing information recorded on the time code track using a head different from a reproducing head for the video data; and editing means for editing the editing material recorded on the recording medium by using the video data stored at the position corresponding to the mark data retrieved by the reproducing means.

6. The editing system as claimed in claim 5, wherein in the second bit area, the same mark data identification code is recorded over a predetermined frame period of the video data.

7. The editing system as claimed in claim 6, wherein the serial number code recorded in the third bit area indicates a recording position of the mark data reproduced by the mark data reproducing means, in the predetermined frame period.

8. The editing system as claimed in claim 7, wherein the reproducing means reproduces all data recorded on the time code track, and wherein the editing means refers to the serial number code reproduced by the reproducing means, thereby calculating a time code corresponding to mark data recorded first of the mark data recorded over the predetermined number of frames so as to recognize the calculated time code as a time code at the time of marking.

9. An editing system for editing a video material recorded on a tape-like recording medium, the editing system comprising:

recording means for recording video data as an editing material onto the recording medium, and recording a plurality of types of mark data onto a time code track arranged in a longitudinal direction of the tape-like recording medium at a position corresponding to the video data on the recording medium in response to the timing and operating state of operation by an operator;

each time code track corresponds to one frame of the video data and includes a synchronizing signal recording area for recording a synchronizing signal, a plurality of time code recording bit areas for recording the time code, and a plurality of user's data recording bit areas; the plurality of user's data recording areas include a first bit area for recording a start code indicating a start position of the user's data, a second bit area for recording mark data identification codes indicating identification codes of the plurality of mark data, a third bit area for recording serial number codes expressing serial numbers of the mark data, and a fourth bit area for recording check data for checking the start code, the mark identification codes and the serial number codes;

reproducing means for retrieving only a predetermined type of mark data selected from the plurality of types of mark data; and editing means for editing the editing material recorded on the recording medium by using the video data stored at the position corresponding to the mark data retrieved by the reproducing means.

10. The editing system as claimed in claim 9, wherein the reproducing means retrieves only a selected type of mark data from the plurality of types of mark data, referring to the mark data identification code.

11. The editing system as claimed in claim 10, wherein in the second bit area, the same mark data identification code is recorded over a predetermined frame period of the video data.

12. The editing system as claimed in claim 11, wherein the serial number code recorded in the third bit area indicates a recording position of the mark data reproduced by the mark data reproducing means, in the predetermined frame period.

13. The editing system as claimed in claim 12, wherein the reproducing means reproduces all data recorded on the time code track, and wherein the editing means refers to the serial number code reproduced by the reproducing means, thereby calculating a time code corresponding to mark data recorded first of the mark data recorded over the predetermined number of frames so as to recognize the calculated time code as a time code at the time of marking.

* * * * *